US007737400B2

(12) United States Patent
Funaki et al.

(10) Patent No.: US 7,737,400 B2
(45) Date of Patent: Jun. 15, 2010

(54) BOLOMETER TYPE UNCOOLED INFRARED RAY SENSOR AND METHOD FOR DRIVING THE SAME

(75) Inventors: Hideyuki Funaki, Tokyo (JP); Yoshinori Iida, Tokyo (JP); Hiroto Honda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/206,234

(22) Filed: Sep. 8, 2008

(65) Prior Publication Data

US 2009/0095909 A1  Apr. 16, 2009

(30) Foreign Application Priority Data

Sep. 20, 2007  (JP) .............................. 2007-243632

(51) Int. Cl.
   *G01J 5/20*   (2006.01)
(52) U.S. Cl. .................................. 250/338.4; 250/332
(58) Field of Classification Search ................ 250/332, 250/338.1, 338.4
   See application file for complete search history.

(56) References Cited

U.S. PATENT DOCUMENTS

| 6,573,504 | B2* | 6/2003 | Iida et al. ................. 250/338.4 |
| 6,759,657 | B2* | 7/2004 | Iida et al. .................... 250/332 |
| 6,770,881 | B2* | 8/2004 | Iida et al. .................... 250/332 |
| 6,809,320 | B2* | 10/2004 | Iida et al. ................. 250/338.4 |
| 7,026,617 | B2 | 4/2006 | Mashio et al. |
| 7,087,900 | B2* | 8/2006 | Iida et al. .................... 250/332 |
| 2001/0028035 | A1* | 10/2001 | Iida et al. ................. 250/338.4 |
| 2002/0195563 | A1* | 12/2002 | Iida et al. .................... 250/332 |
| 2003/0057372 | A1* | 3/2003 | Iida et al. ................. 250/338.4 |
| 2004/0108460 | A1* | 6/2004 | Iida et al. .................... 250/332 |
| 2005/0029454 | A1* | 2/2005 | Iida et al. .................... 250/332 |
| 2008/0251721 | A1* | 10/2008 | Ueno ........................ 250/332 |

FOREIGN PATENT DOCUMENTS

JP      3793033      4/2006

OTHER PUBLICATIONS

U.S. Appl. No. 12/050,572, filed Mar. 18, 2008, Hiroto Honda, et al.

* cited by examiner

*Primary Examiner*—David P Porta
*Assistant Examiner*—Mark R Gaworecki
(74) *Attorney, Agent, or Firm*—Oblon, Spivak, McClelland, Maier & Neustadt, L.L.P.

(57) ABSTRACT

A bolometer type uncooled infrared ray sensor includes: an image pickup region having detection pixels arranged in a matrix form on a semiconductor substrate to detect incident infrared rays; a plurality of row selection lines provided in the image pickup region; current sources capable of letting constant currents flow through the respective row selection lines; a plurality of signal lines provided in the image pickup region; voltage readout circuits provided so as to respectively correspond to the signal lines to read out signal voltages generated on the respectively corresponding signal lines; coupling capacitances respectively provided between the respective signal lines and the corresponding voltage readout circuits; and a calculator which calculates a difference between two signal voltages read out by the voltage readout circuits, corresponding to outputs of the same detection pixel for two different current values supplied from the current sources.

4 Claims, 9 Drawing Sheets

FIG. 1

A-A SECTIONAL VIEW

BOLOMETER TYPE UNCOOLED INFRARED RAY SENSOR AND METHOD FOR DRIVING THE SAME

CROSS-REFERENCE TO RELATED APPLICATION

This application is based upon and claims the benefit of priority from prior Japanese Patent Application No. 2007-243632 filed on Sep. 20, 2007 in Japan, the entire contents of which are incorporated herein by reference.

BACKGROUND OF THE INVENTION

1. Field of the Invention

The present invention relates to a bolometer type uncooled infrared ray sensor and its driving method.

2. Related Art

Image sensors utilizing infrared rays have features that they can pick up images night and day and the infrared rays are higher in permeability through smoke or fog than visible light. In addition, the image sensors utilizing infrared rays have a feature that temperature information of a subject can also be obtained. Therefore, the image sensors utilizing infrared rays have a wide application range as surveillance cameras and fire sensing cameras not to speak of the defense field.

A greatest drawback of quantum type infrared ray solid image pickup devices which are conventional mainstream devices is that a cooling mechanism for low temperature operation is needed. In recent years, however, uncooled infrared ray image sensors which do not need such a cooling mechanism have been developed (see, for example, Japanese Patent No. 3793033).

However, it can be said that the infrared ray image sensors are insufficient in sensitivity and dynamic range as compared with image sensors utilizing visible rays. For example, if it is attempted to use the infrared ray image sensors in surveillance camera, sensors having a NETD (Noise Equivalent Temperature Difference) of approximately 0.1 K and a dynamic range of approximately 30 K are needed. Development of a sensor having enhanced output linearity, a higher sensitivity and a wider dynamic range is anticipated.

On the other hand, noise generated in image sensors can be broadly classified into random noise and fixed pattern noise. As the random noise, there are 1/f noise having a power spectrum which is in inverse proportion to the frequency f and kTC noise which is thermal noise caused by capacitance. The fixed pattern noise is caused mainly by characteristic variations of diodes and threshold variations of transistors.

For reducing such noise, the noise can be canceled in principle by finding a difference between a signal voltage and a reference signal before and after resetting. Such a correlated double sampling (CDS) circuit with an electrical reset switch is typically used in visible region image sensors using photodiodes. In the case of thermal sensors using a bolometer, a thermal reset mechanism must be fabricated, making the CDS circuit unpractical.

Although the fixed pattern noise and 1/f noise are dominant in conventional bolometer type uncooled infrared ray sensors as described above, there are no effective means, resulting in a problem.

SUMMARY OF THE INVENTION

The present invention has been made in view of these circumstances, and an object of thereof is to provide a bolometer type uncooled infrared ray sensor and its driving method capable of reducing the fixed pattern noise and 1/f noise without fabricating a thermal reset mechanism.

According to a first aspect of the present invention, there is provided a bolometer type uncooled infrared ray sensor including: an image pickup region having detection pixels arranged in a matrix form on a semiconductor substrate to detect incident infrared rays, each of the detection pixels being formed of one or more diodes connected in series; a plurality of row selection lines provided in the image pickup region so as to respectively correspond to rows of the detection pixels and connected to anodes of the diodes in the respectively corresponding rows; current sources capable of letting constant currents flow through the respective row selection lines; a plurality of signal lines provided in the image pickup region so as to respectively correspond to columns of the detection pixels and connected to cathodes of the diodes in the respectively corresponding columns; voltage readout circuits provided so as to respectively correspond to the signal lines to read out signal voltages generated on the respectively corresponding signal lines; coupling capacitances respectively provided between the respective signal lines and the corresponding voltage readout circuits; and a calculator which calculates a difference between two signal voltages read out by the voltage readout circuits, corresponding to outputs of the same detection pixel for two different current values supplied from the current sources.

According to a second aspect of the present invention, there is provided a bolometer type uncooled infrared ray sensor including: an image pickup region having detection pixels arranged in a matrix form on a semiconductor substrate to detect incident infrared rays, each of the detection pixels being formed of one or more diodes connected in series; a plurality of row selection lines provided in the image pickup region so as to respectively correspond to rows of the detection pixels and connected to anodes of the diodes in the respectively corresponding rows; current sources capable of letting constant currents flow through the respective row selection lines; a plurality of signal lines provided in the image pickup region so as to respectively correspond to columns of the detection pixels and connected to cathodes of the diodes in the respectively corresponding columns; one row of non-sensitivity pixels having no infrared ray sensitivity disposed in the image pickup region in a direction of the rows; and voltage readout circuits provided so as to respectively correspond to the signal lines to read out a difference between signal voltages generated on the respectively corresponding signal lines and output of the non-sensitivity pixels.

According to a third aspect of the present invention, there is provided a drive method for a bolometer type uncooled infrared ray sensor, the bolometer type uncooled infrared ray sensor including an image pickup region having detection pixels arranged in a matrix form on a semiconductor substrate to detect incident infrared rays, each of the detection pixels being formed of one or more diodes connected in series; a plurality of row selection lines provided in the image pickup region so as to respectively correspond to rows of the detection pixels and connected to anodes of the diodes in the respectively corresponding rows; current sources capable of letting constant currents flow through the respective row selection lines; and a plurality of signal lines provided in the image pickup region so as to respectively correspond to columns of the detection pixels and connected to cathodes of the diodes in the respectively corresponding columns, the drive method comprising: selecting one row selection line from the row selection lines; letting flow a first bias current through the diodes connected to the selected row selection line; reading out and retaining a first voltage generated on the corresponding signal line by the first bias current; letting flow a second bias current which is different from the first bias current through the diodes connected to the selected row selection line; reading out and retaining a second voltage generated on the corresponding signal line by the second bias current; and finding a difference between the first voltage and the second voltage.

DESCRIPTION OF THE EMBODIMENTS

Prior to describing embodiments of the present invention, how the present invention comes about will now be described.

Infrared rays emitted from an object are focused by an optical lens disposed in front of a sensor to raise the temperature of a diode formed of silicon installed in a hollow region so as to prevent heat from escaping to the outside. For example, if a Ge lens having a transmittance of 90% in a wavelength region of 8 to 12 µm and an F value of 1.0 is used, a temperature rise of the diode per 1 K of the object becomes approximately 1 mK. A constant current $I_s$ is let flow through the diode by a constant current source 8. A current I flowing through the diode is represented by $$I = I_s \times (e^{qV/(kT)} - 1) \quad (1)$$

as a function of the absolute temperature T. Here, q is an elementary charge ($=1.602 \times 10^{-19}$ C) and k is the Boltzmann's constant ($=1.38 \times 10^{-23}$ J/K). If the value of $\exp(qV/(kT))$ is sufficiently great, $-1$ located at the end of Equation (1) can be neglected and Equation (1) can be rewritten as $$I = I_s \times \exp(qV/(kT)) \quad (2)$$

Here, with constant A, $I_s$ is represented as $$I_s = A \times \exp(-E_g/(kT)) \quad (3)$$

Here, $E_g$ is a band gap of silicon (approximately 1.11 eV). Substituting Equation (3) into Equation (2), $$I = A \times \exp(-E_g/(kT)) \times \exp(qV/(kT)) \quad (4)$$

is obtained. Diving the both sides by A, finding logarithms of the both sides, and finding V, $$V = V_g - T \times k/q \cdot \ln(A/I) \quad (5)$$

is obtained. Since I is kept constant, all factors in Equation (5) become constants except T. Therefore, Equation (5) can be differentiated simply and $$\partial V/\partial T = k/q \times \ln(I/A) \quad (6)$$

is obtained. Substituting Equation (4) into Equation (6), a temperature coefficient which determines a sensitivity of a bolometer is found as $$\partial V/\partial T = 1/T \times (V - E_g/q) \quad (7)$$

Here, $V_g = E_g/q$ is called band gap voltage, and its value becomes approximately 1.11 V in silicon.

Figure 5:
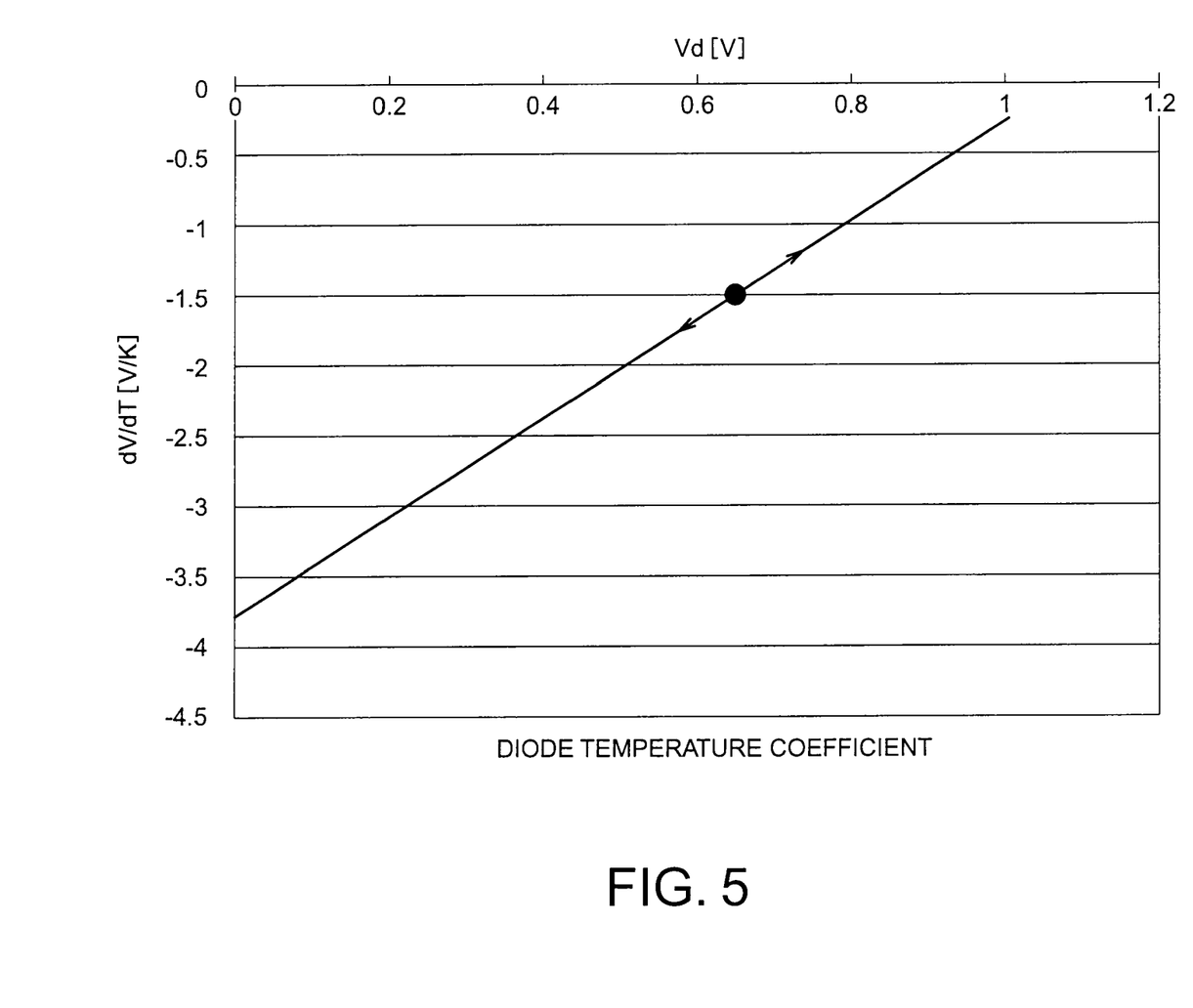
FIG. 5 is a diagram showing dependence of a temperature coefficient of a diode upon its bias voltage.

Since the temperature of the diode thus rises, the voltage drop across the diode falls. As the current becomes small (as the forward voltage becomes small), the sensitivity becomes large. As the temperature becomes high, the sensitivity becomes small. FIG. 5 shows a graph of the temperature coefficient of the diode. When the temperature is 300 K and the forward voltage is 0.65 V, the temperature coefficient becomes equal to approximately $-1.5$ mV/K. When the temperature is 300 K and the forward voltage is 0.51 V, the temperature coefficient becomes approximately $-2$ mV/K. By the way, it is indicated that V becomes $V_g$ when the temperature is absolute zero degree (T=0).

According to Equation (7), a change quantity of voltage drop caused by the temperature change is given by $$\Delta V_d = \Delta T/T \times (V_d - E_g/q) \quad (8)$$

On the other hand, if an operating point of the constant current source is changed, $$\Delta V_d' = \Delta T/T \times (V_d' - E_g/q) \quad (9)$$

is obtained. Subtracting Equation (8) from Equation (9), Equation (10) is obtained.

$$\Delta T/T = (\Delta V_d - \Delta V_d')/(V_d - V_d') \quad (10)$$

From Equation (10), the present inventors have found the following fact. If readout is conducted a plurality of times for current values differing in operating point, it becomes possible to cancel the bias component and self heating component contained in $V_d$ and only a signal component can be extracted. As a result, it becomes possible to remove fixed pattern noise, 1/f noise and reset noise caused by variations of the diode.

Embodiments of the present invention will now be described with reference to the drawings.

First Embodiment

Figure 1:
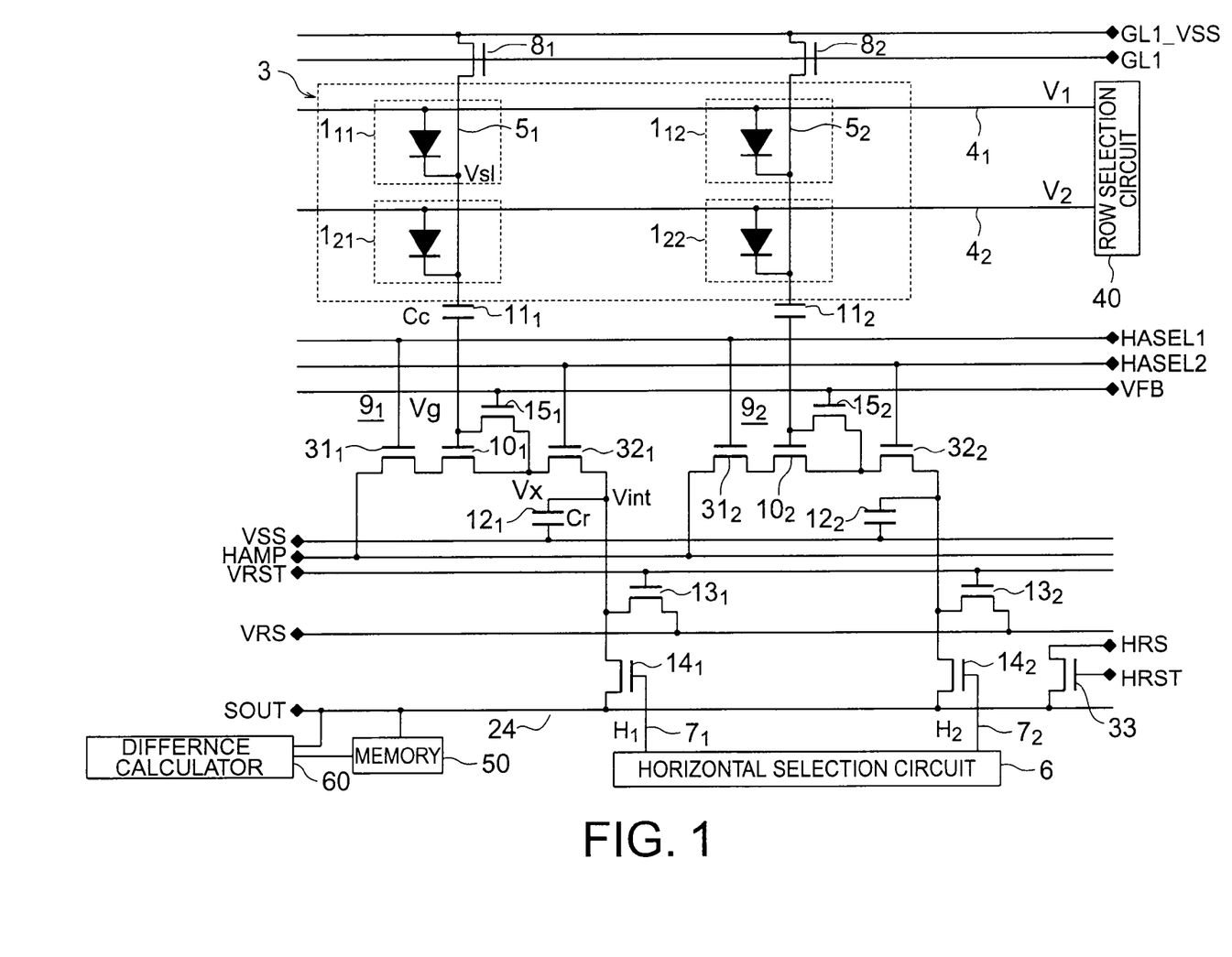
FIG. 1 is a circuit diagram of an infrared ray sensor according to a first embodiment.

A circuit of a bolometer type uncooled infrared ray sensor according to a first embodiment of the present invention is shown in FIG. 1. In FIG. 1, a 2 by 2 pixel configuration having two rows by two columns is shown to simplify the description. As a matter of course, however, the circuit can be applied to an m by n pixel configuration having more rows by more columns.

Infrared ray detection pixels $1_{ij}$ (i, j=1, 2) which convert incident infrared rays to an electrical signal are disposed on a semiconductor substrate in a two-dimensional form to constitute an image pickup region 3. Within the image pickup region 3, a plurality of row selection lines $4_1$ and $4_2$ and a plurality of vertical signal lines $5_1$ and $5_2$ are disposed.

For pixel selection, a row selection circuit 40 and a horizontal selection circuit 6 are disposed in the row direction and the column direction of the image pickup region, respectively. The row selection lines $4_1$ and $4_2$ are connected to the row selection circuit 40, and horizontal selection lines 7₁ and 7₂ are connected to the horizontal selection circuit 6. As constant current sources for obtaining a pixel output voltage, load MOS transistors 8₁ and 8₂ are connected to the vertical signal lines 5 of respective columns. A substrate voltage $GL1\_V_{SS}$ is applied to sources of the load MOS transistors 8₁ and 8₂, and a gate control voltage GL1 is applied to gates of the load MOS transistors 8₁ and 8₂.

A power supply voltage $V_1$ is applied to a row selection line (for example, 4₁) selected by the row selection circuit 40, whereas $V_2$ is applied to a row selection line (for example, 4₂) which is not selected by the row selection circuit 40. As a result, a pn junction within an infrared ray detection pixel of the selected row is forward-biased and a bias current flows through the pn junction. An operating point is determined by a temperature of the pn junction and the forward bias current, and a pixel signal output voltage is generated on the vertical signal line $5_j$ (j=1, 2) of each column. At this time, a pn junction in a pixel 1 which is not selected by the row selection circuit 40 is reverse-biased. In other words, a pn junction in each pixel has a pixel selection function.

The voltage generated on the vertical signal line $5_j$ (j=1, 2) is an extremely low voltage. As the ratio between a temperature change dTs of the subject and a pixel temperature change dTd, $5\times10^{-3}$ is supposed. On the basis of this value and a thermoelectric conversion sensitivity dV/dTd=10 mV/K obtained when eight pn junctions are connected in series as a pn junction in each pixel, it is appreciated that the voltage generated on the vertical signal line $5_j$ (j=1, 2) is barely 5 μV when dTs=0.1 K. For recognizing this temperature difference of the subject, therefore, it becomes necessary to cause the noise generated on the vertical signal line 5 to become 5 μV or less. This noise value is as low as approximately ⅛₀ of noise of a CMOS sensor which is a visible ray image sensor of MOS type.

An amplifying readout circuit $9_j$ (j=1, 2) is disposed for each column in order to amplify this low signal voltage. Each amplifying readout circuit $9_j$ (j=1, 2) includes a amplifying transistor $10_j$, coupling capacitance $11_j$, storage capacitance $12_j$, a reset transistor $13_j$, a sample transistor $15_j$, and first and second selection transistors $31_j$ and $32_j$. The amplifying transistor $10_j$ in each amplifying readout circuit $9_j$ (j=1, 2) is capacitance-coupled at its gate to the vertical signal line $5_j$ in the corresponding column by the coupling capacitance $11_j$. From the DC aspect, the vertical signal line $5_j$ and the amplifying readout circuit $9_j$ are separated from each other by the coupling capacitance $11_j$.

The amplifying transistor $10_j$ (j=1, 2) is connected at its source to the first selection transistor $31_j$ at its drain, and a control signal HAMP is applied to the first selection transistor $31_j$ at its source. The amplifying transistor $10_j$ (j=1, 2) is connected at its drain to the storage capacitance $12_j$ for integrating the current-amplified signal current and storing the result via the second selection transistor $32_j$. Control signals HASEL1 and HASEL2 are applied to gates of the first and second selection transistors $31_j$ and $32_j$ (j=1, 2), respectively.

Storage time for integrating the signal current is determined by a row selection pulse which is applied to the row selection line $4_j$ (j=1, 2) by the row selection circuit 40. A first end of the storage capacitance $12_j$ (j=1, 2) is connected to the reset transistor $13_j$ for resetting a voltage across the storage capacitance $12_j$ at its drain. Reset operation is conducted after readout of a signal voltage conducted by a horizontal selection transistor $14_j$ has been completed. A second end of the storage capacitance $12_j$ (j=1, 2) is connected to a ground power supply VSS. Furthermore, a reset signal VRST is applied to the reset transistor $13_j$ at its gate, and a voltage VRS is applied to the reset transistor $13_j$ at its source. The horizontal selection transistor $14_j$ (j=1, 2) is connected at its gate to the horizontal selection line $7_j$, and supplied with a selection signal $H_j$ from the horizontal selection circuit 6. A readout signal SOUT is output from an output signal line 24 connected to the horizontal selection transistor $14_j$ (j=1, 2) at its drain. An output reset transistor 33 is connected at its drain to the output signal line 24. A control signal HRST is applied to the output reset transistor 33 at its gate. A control signal HRS is applied to the output reset transistor 33 at its source. A memory 50 and a difference calculator 60 are connected to the output signal line 24.

The drain of the amplifying transistor $10_j$ (j=1, 2) is connected to the gate of the amplifying transistor $10_j$ via the sample transistor $15_j$. The gate and drain of the amplifying transistor $10_j$ are made to have the same potential by turning on the sample transistor $15_j$. A control signal VFB is applied to the sample transistor $15_j$ (j=1, 2) at its gate. In FIG. 1, one diode is connected. Alternatively, the sensitivity to the incident infrared rays can be increased by connecting a plurality of diodes.

Figure 2A:
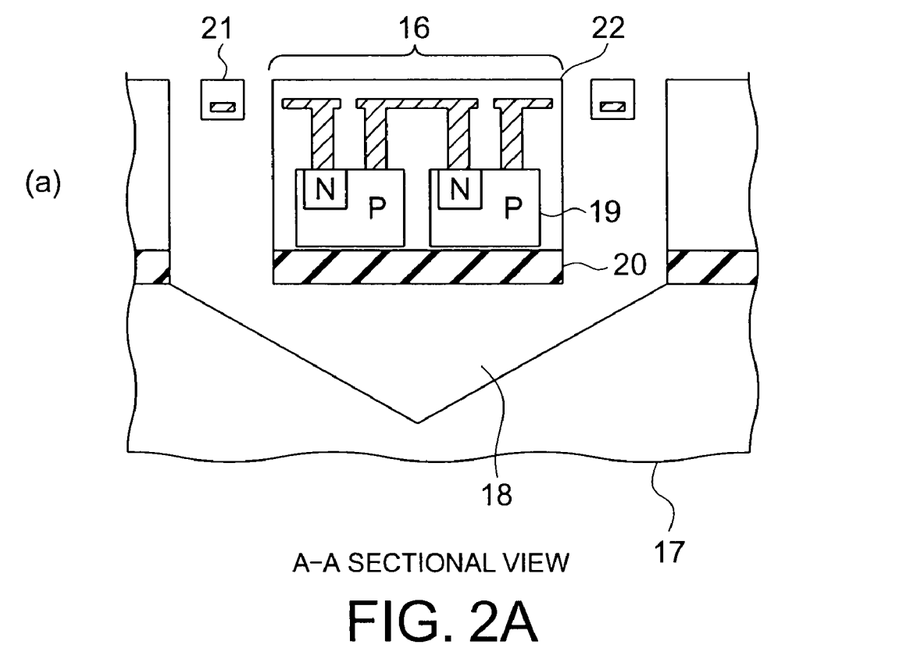
FIGS. 2A and 2B are diagrams showing a structure of an infrared ray sensor in embodiments of the present invention.
Figure 2B:
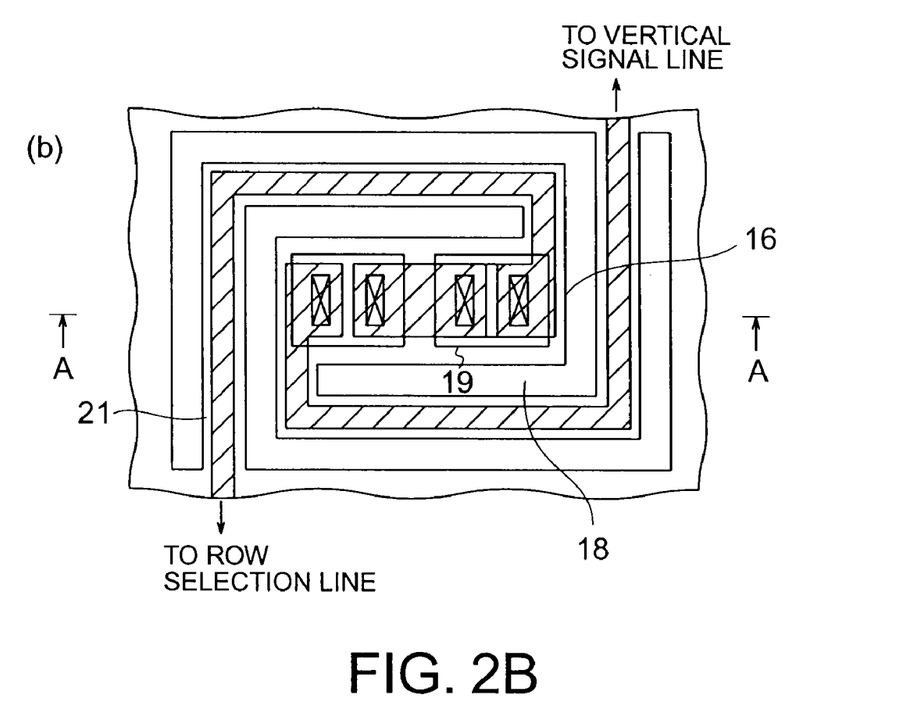

FIGS. 2A and 2B respectively show a section structure and a plan structure of the infrared ray detection pixel in the infrared ray sensor according to the present embodiment. A sensor part 16 including a pn junction for thermoelectric conversion includes an infrared ray absorption layer 22, a pn junction within a SOI layer 19 formed for thermoelectric conversion, and a silicon oxide film layer 20 supporting the SOI layer 19, which are formed on a hollow structure 18 formed within a single crystal silicon supporting substrate 17. A supporting part 21 is provided to support the sensor part 16 on the hollow structure 18 and output an electric signal supplied from the sensor part 16. A connection part (not illustrated) is provided to connect the sensor part 16 to the vertical signal lines 5₁ and 5₂ and the row selection lines 4₁ and 4₂.

A structure which efficiently conducts modulation of the temperature of the sensor part 16 using the incident infrared rays is implemented by thus providing the sensor part 16 and the supporting part 21 on the hollow structure 18. FIGS. 2A and 2B show a structure in the case where two pn junctions are connected in series.

Figure 3:
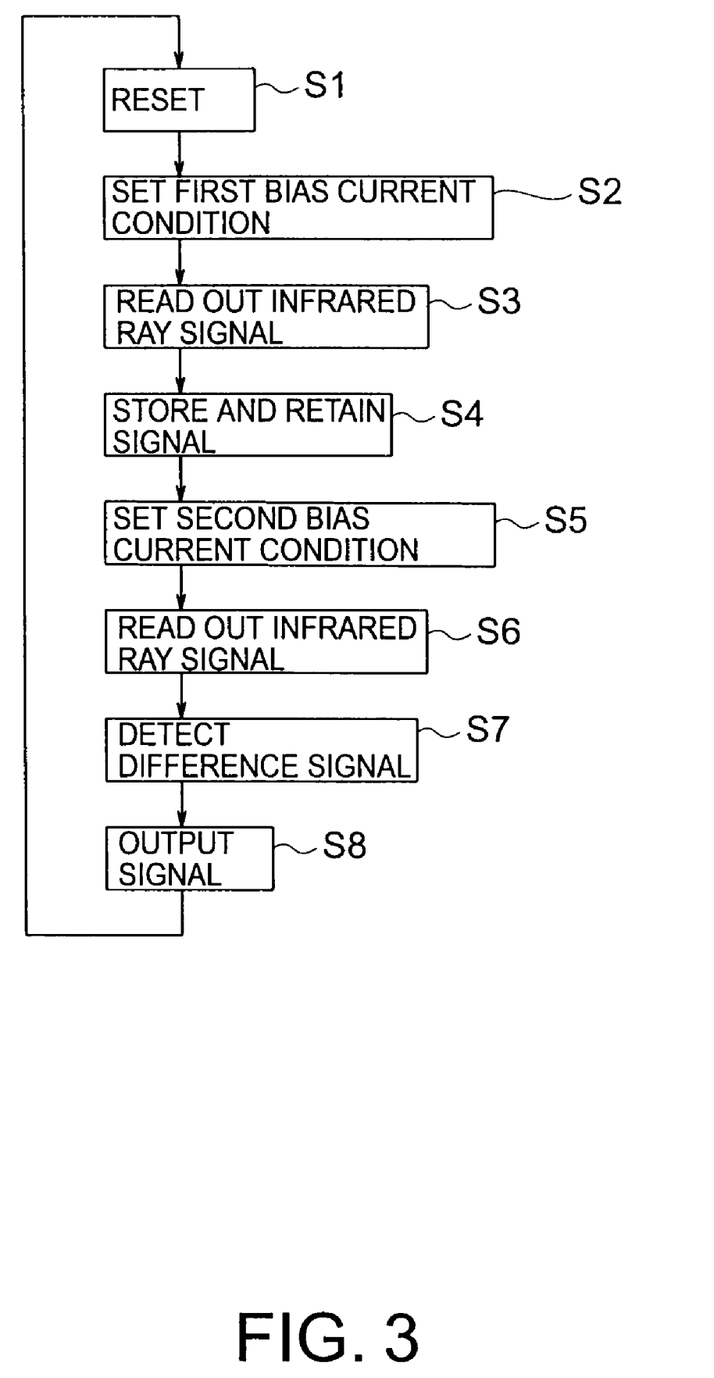
FIG. 3 is a flow chart for explaining a drive method of the infrared ray sensor according to the first embodiment.
Figure 4:
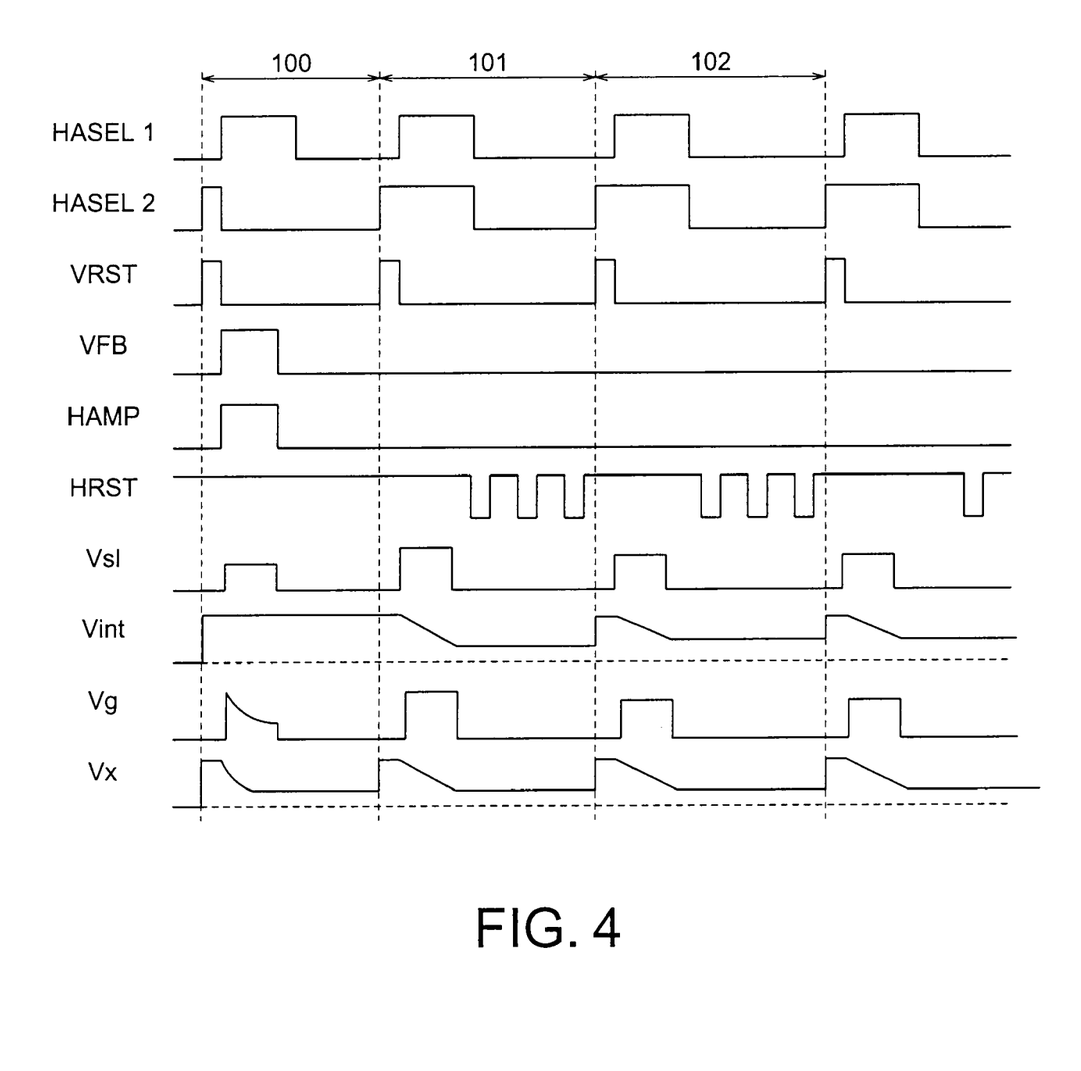
FIG. 4 is a timing chart for explaining the drive method of the infrared ray sensor according to the first embodiment.

A drive method for the infrared ray sensor according to the present embodiment will now be described with reference to FIGS. 3 and 4. FIG. 3 shows a procedure of the drive method for the infrared ray sensor according to the present embodiment. FIG. 4 shows its timing chart.

In the drive method for the infrared ray sensor according to the present embodiment, readout is conducted a plurality of times for current values differing in operating point.

First, reset is conducted as represented in step S1 in FIG. 3. In other words, the reset transistor $13_j$ (j=1, 2) and the second selection transistor $32_j$ are turned on. As a result, the storage capacitance $12_j$ is charged, and electric charge $Q=C_r\times VRS$ is stored (see a reset time period 100 in FIG. 4).

Subsequently, a row selection line (for example, the row selection line 4₁) is selected by the row selection circuit 40, and a first bias current condition is set on the selected row selection line (step S2). In other words, the reset transistor $13_j$ (j=1, 2) and the second selection transistor $32_j$ are turned off, and then the sample transistor $15_j$ and the first selection transistor $31_j$ are turned on. As a result, the source voltage and the gate voltage Vg of the amplifying transistor $10_j$ are set equal to $V_{hamp}$ and $V_{hamp}+V_{th}$, respectively. Here, $V_{hamp}$ is a voltage of the control signal HAMP, and $V_{th}$ is a threshold voltage of the amplifying transistor $10_j$.

Subsequently, infrared ray signal readout is conducted, and the signal thus read out is stored and retained (steps S3 and S4). In other words, $V_{hamp}$ is set to $V_{hamp}=0$ and the sample transistor $15_j$ (j=1, 2) is turned off. Then, a voltage is applied to the selected row selection line $4_j$ (j=1, 2) by the row selection circuit 40. As a result, a current flows through a plurality of diodes connected in series in the pixel 1 connected to the row selection line and the load transistor $8_j$ (j=1, 2). A constant current I flows through the diodes by suitably choosing the value of the gate voltage of the load transistor $8_j$. A change $\Delta V_d$ of voltage drop across the diodes caused by a temperature rise $\Delta T_d$ of the diodes which is in turn caused by infrared rays changes the gate voltage Vg of the amplifying transistor $10_j$ to $V_{hamp}+V_{th}+\Delta T_d$ via the coupling capacitance $11_j$ (j=1, 2). The change of the gate voltage Vg of the amplifying transistor $10_j$ (j=1, 2) changes a quantity of charge which flows out from the storage capacitance $12_j$. The quantity of charge can be controlled by suitably setting the voltage $V_{hamp}$ of the control signal HAMP. Thereafter, potentials of the storage capacitances $12_j$ can be read successively through the output signal line 24 by turning on the horizontal selection transistors $14_j$ (j=1, 2) successively. Those values are retained in the memory 50 temporarily (see a readout time period 101 shown in FIG. 4). Potentials $V_{out}$ of storage capacitances corresponding to respective pixel outputs in one row connected to the selected row selection line are stored in the memory 50.

Subsequently, a second bias current condition which differs in operating point from the first bias current condition is set on the selected row selection line (step S5). Infrared ray signal readout is conducted in the same way as the foregoing description (see a readout time period 102 shown in FIG. 4). The potential $V_{out}'$ of the storage capacitance $12_j$ caused by a change $\Delta V_d'$ of voltage drop across the diodes is read (step S6). The difference calculator 60 finds a difference between the potential $V_{out}'$ and the potential $V_{out}$ at the operating point under the first bias current condition stored in the memory 50 (step S7). As a result, an infrared ray signal having little noise can be obtained (step S8). The process of the steps 1 to 8 is conducted for respective selected row lines successively.

In FIG. 4, a control voltage Vs1 is an output voltage of the diodes. Vint is a storage voltage of the storage capacitance $12_i$ (i=1, 2). Vg is a gate voltage of the amplifying transistor $10_i$ (i=1, 2). A control voltage Vx is a drain voltage of the amplifying transistor $10_i$ (i=1, 2).

Figure 6:
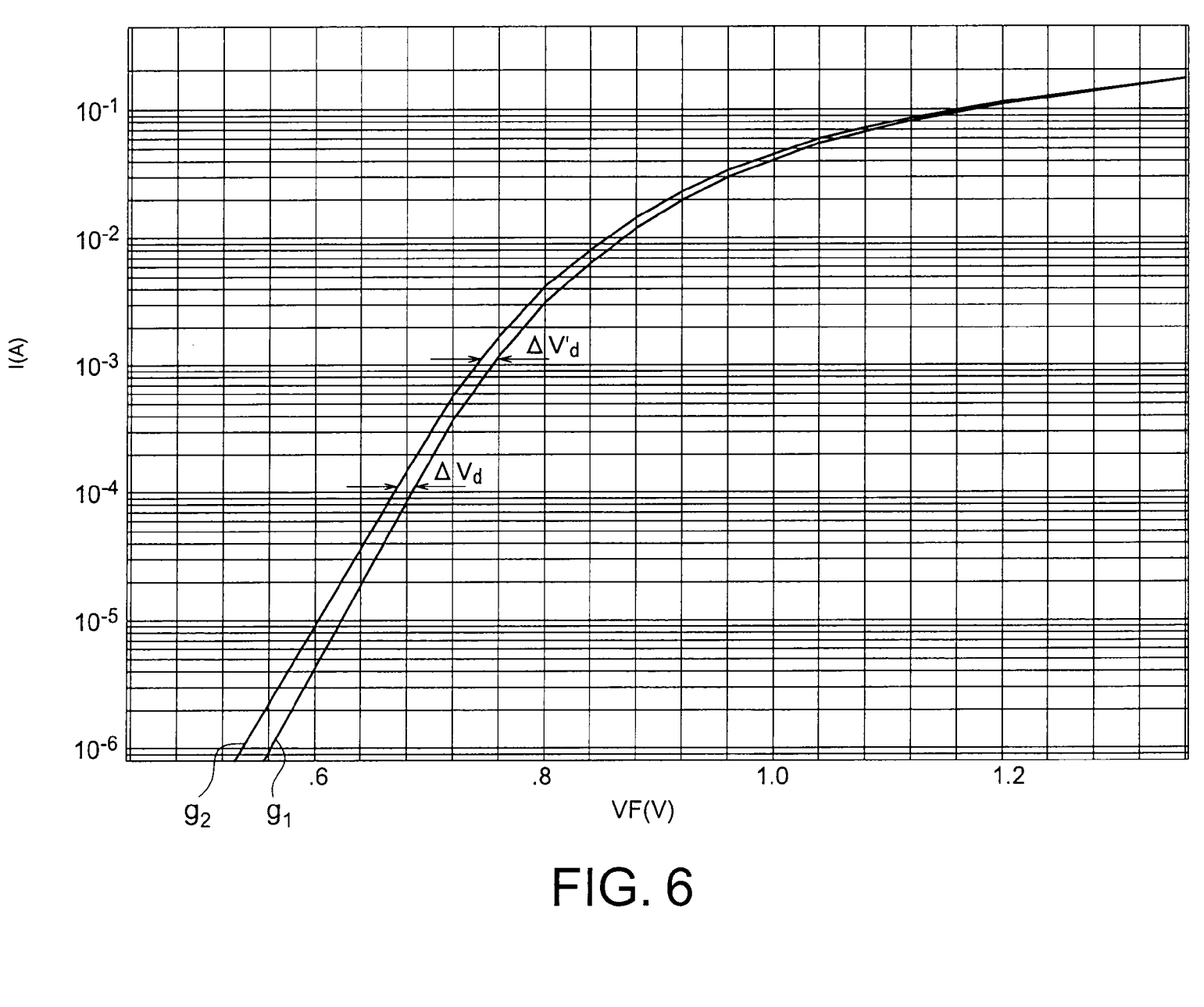
FIG. 6 is a diagram showing a simulation result of current-voltage characteristics of the infrared ray sensor according to the first embodiment.

Results obtained by conducting simulation on operating points under the first and second bias current conditions are shown in FIG. 6. In FIG. 6, the axis of abscissas indicates a voltage VF between the anode and cathode of the diodes, and the axis of ordinates indicates a current I which flows through the diodes. A graph $g_1$ indicates I-V characteristics of a diode at a room temperature 300 K. A graph $g_2$ indicates I-V characteristics of the diode at 310 K. The change $\Delta V_d$ of voltage drop across the diode at the operating point under the first bias current condition and the change $\Delta V_d'$ of the voltage drop across the diode at the operating point under the second bias current condition are exhibited.

Figure 7:
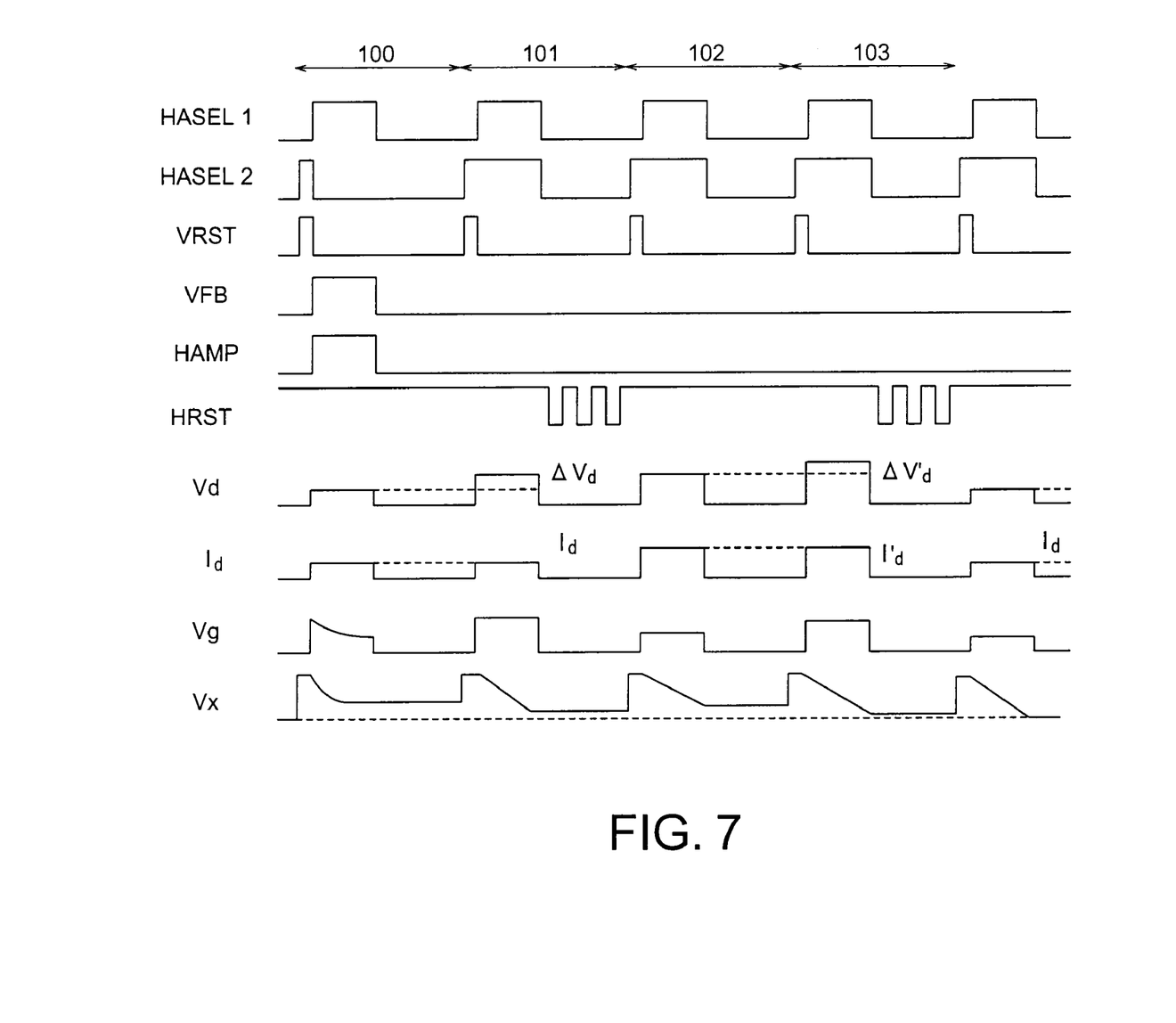
FIG. 7 is a waveform diagram showing simulation results of timing chart drive for explaining a drive method of an infrared ray sensor according to the first embodiment.

Supposing that only pixels $1_{11}$ and $1_{12}$ connected to the vertical signal line $5_1$ in the present embodiment are replaced by reference cells formed of non-sensitivity pixels 2 having no infrared ray sensitivity, simulation is conducted on the operating points under the first and second bias current conditions. A resultant waveform diagram is shown in FIG. 7. In FIG. 7, readout time periods 100 and 102 are time periods for conducting readout from reference cells 2 (see FIG. 9) whereas readout time periods 101 and 103 are time periods for conducting readout from pixel cells 1. Readout from reference cells 2 and readout from pixel cells 1 are conducted alternately.

Figure 8:
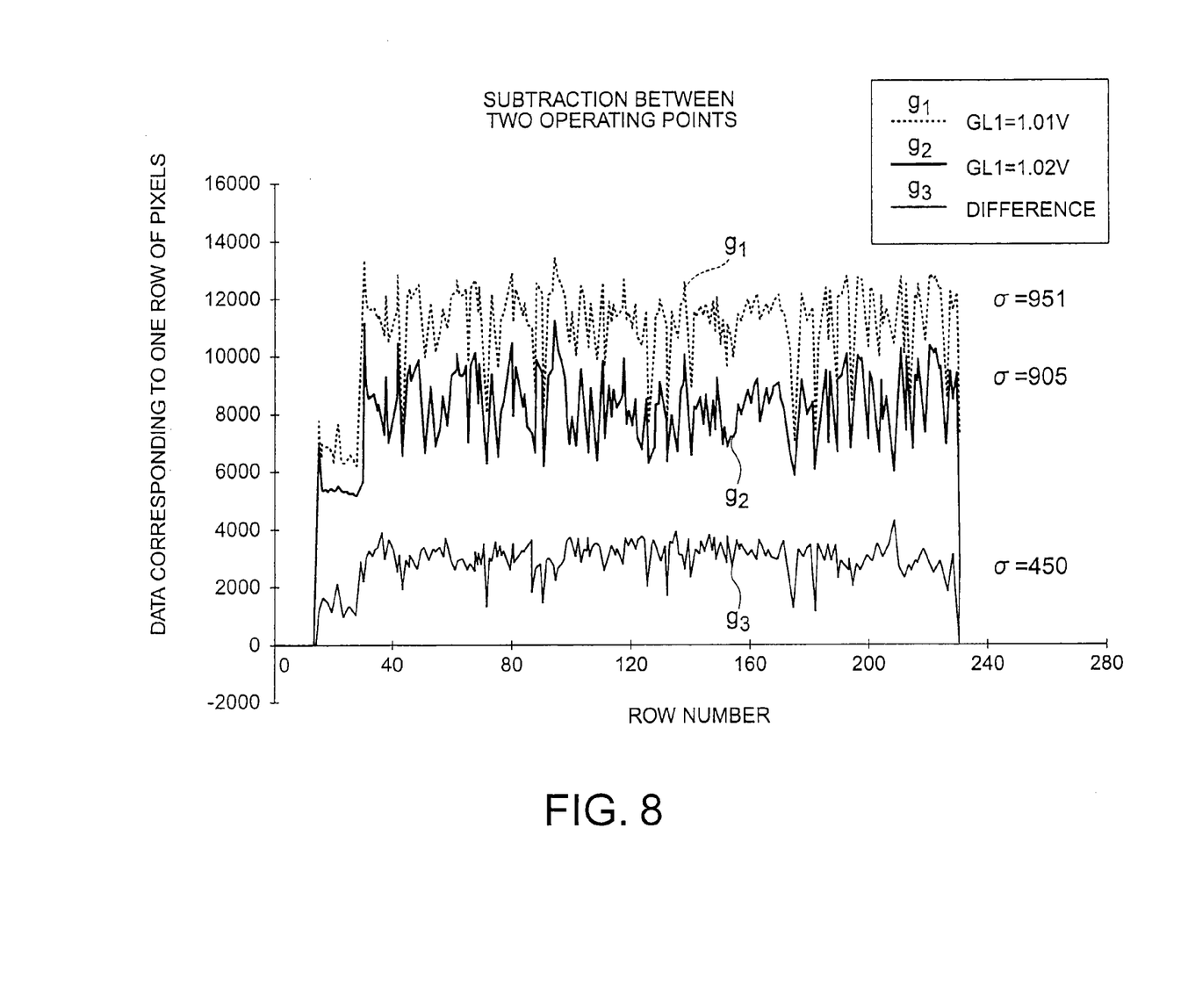
FIG. 8 is a diagram showing signal waveforms and a difference between them which are experimentally obtained with respect to two bias current values.

An infrared ray sensor according to the present embodiment which includes twelve pixels in each row is created. Signals and a difference between them which are obtained by experimentally finding data (gradient after A/D transformation) of corresponding to one row of pixels (corresponding to 12 bits) with respect to two bias current values of the infrared ray sensor are shown in FIG. 8. A graph $g_1$ in FIG. 8 is a signal waveform diagram obtained when 1.01 V is applied to the load MOS transistor $8_i$ (i=1, 2) as the control voltage GL1. A graph $g_2$ in FIG. 8 is a signal waveform diagram obtained when 1.02 V is applied to the load MOS transistor $8_i$ (i=1, 2) as the control voltage GL1. A graph $g_3$ is a signal waveform diagram indicating the difference between them. Values of standard deviation σ indicating variations of the graphs $g_1$ and $g_2$ are 951 and 905, respectively. A value of standard deviation σ indicating variations of the graph $g_3$ is 450. It is appreciated from this that the variations can be suppressed to approximately half by obtaining the difference between the signals.

According to the present embodiment, the fixed pattern noise and 1/f noise can be reduced without fabricating the thermal reset mechanism as heretofore described.

Second Embodiment

Figure 9:
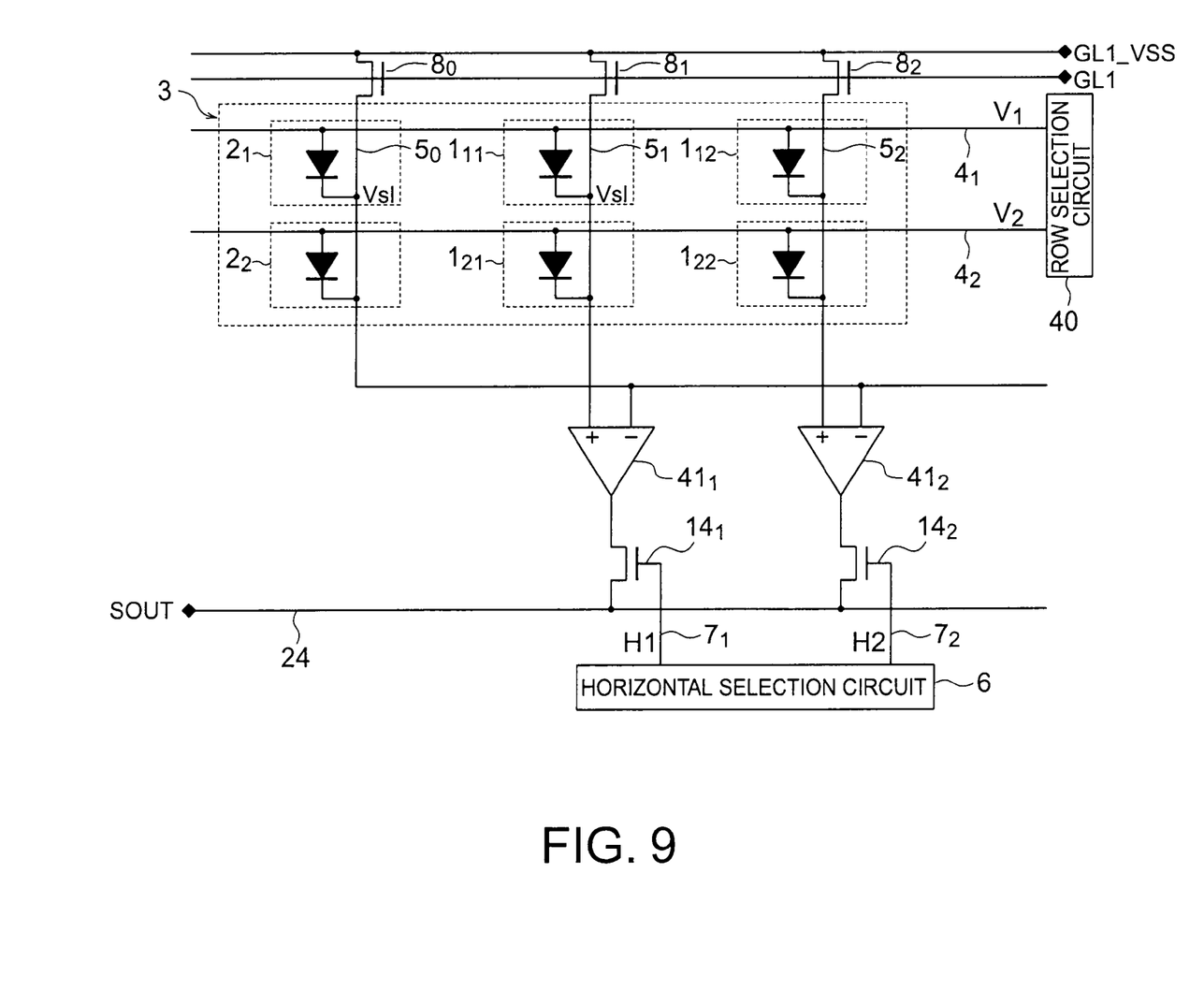
FIG. 9 is a circuit diagram of an infrared ray sensor according to a second embodiment.

A circuit of a bolometer type uncooled infrared ray sensor according to a second embodiment of the present invention is shown in FIG. 9. Unlike the infrared ray sensor according to the first embodiment, the mechanism for reading out the signal voltage does not read a potential change of the storage capacitance, but directly reads out the voltage of the diode by using a differential amplifier in the infrared ray sensor according to the present embodiment. Therefore, the infrared ray sensor according to the present embodiment has a configuration obtained by removing the amplifying readout circuits $9_j$ (j=1, 2) from the infrared ray sensor in the first embodiment shown in FIG. 1, providing differential amplifiers (operational amplifiers) $41_j$ (j=1, 2) instead, disposing one row of reference cells each formed of a non-sensitivity pixel 2 having no infrared ray sensitivity in the image pickup region 3, disposing a reference vertical signal line $5_0$ connected to those reference cells, and a load MOS transistor $8_0$ connected to the reference vertical signal line $5_0$. A substrate voltage $GL1\_V_{SS}$ is applied to the load MOS transistor $8_0$ at its source, and a gate control voltage GL1 is applied to the load MOS transistors $8_0$ at its gate. Each differential amplifier $41_j$ (j=1, 2) compares a signal voltage read out from a signal line which is connected to a selected cell with a reference voltage supplied from the reference vertical signal line $5_0$ which is connected to the reference cell. A resultant output is read out via a horizontal selection transistor $14_j$ turned on by the horizontal selection circuit 6.

In the present embodiment as well, the fixed pattern noise and 1/f noise can be reduced without fabricating the thermal reset mechanism in the same way as the first embodiment.

In the infrared ray sensor according to the present embodiment, control signals can be reduced remarkably as compared with the first embodiment because differential amplifiers 41 are used instead of the amplifying readout circuits each including a plurality of transistors.

According to the embodiments of the present invention, a bolometer type uncooled infrared ray sensor with the fixed pattern noise and 1/f noise reduced without fabricating the thermal reset mechanism can be provided as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A bolometer type uncooled infrared ray sensor comprising:
   an image pickup region having detection pixels arranged in a matrix form on a semiconductor substrate to detect incident infrared rays, each of the detection pixels being formed of one or more diodes connected in series;
   a plurality of row selection lines provided in the image pickup region so as to respectively correspond to rows of the detection pixels and connected to anodes of the diodes in the respectively corresponding rows;
   current sources capable of letting constant currents flow through the respective row selection lines;
   a plurality of signal lines provided in the image pickup region so as to respectively correspond to columns of the detection pixels and connected to cathodes of the diodes in the respectively corresponding columns;
   voltage readout circuits provided so as to respectively correspond to the signal lines to read out signal voltages generated on the respectively corresponding signal lines;
   coupling capacitances respectively provided between the respective signal lines and the corresponding voltage readout circuits; and
   a calculator which calculates a difference between two signal voltages read out by the voltage readout circuits, corresponding to outputs of the same detection pixel for two different current values supplied from the current sources.

2. The sensor according to claim 1, wherein each of the voltage readout circuits comprises:
   an amplifying transistor modulated by a signal voltage generated on a corresponding signal line;
   storage capacitance connected to the amplifying transistor at its drain to store signal charge supplied from the amplifying transistor;
   a resetter which resets a potential at the drain of the amplifying transistor;
   a signal charge reader which reads out the signal charge retained by the storage capacitance; and
   a sampling transistor provided between the drain and gate of the amplifying transistor.

3. The sensor according to claim 1, further comprising:
   a readout wiring part provided on the semiconductor substrate;
   a support structure part disposed over a hollow part which is formed on a surface part of the semiconductor substrate, the support structure part having connection wiring electrically connected to the readout wiring part; and
   a cell part disposed over the hollow part and supported by the support structure part,
   wherein the image pickup region is provided on the cell part.

4. A drive method for a bolometer type uncooled infrared ray sensor, the bolometer type uncooled infrared ray sensor including an image pickup region having detection pixels arranged in a matrix form on a semiconductor substrate to detect incident infrared rays, each of the detection pixels being formed of one or more diodes connected in series;
   a plurality of row selection lines provided in the image pickup region so as to respectively correspond to rows of the detection pixels and connected to anodes of the diodes in the respectively corresponding rows;
   current sources capable of letting constant currents flow through the respective row selection lines;
   and a plurality of signal lines provided in the image pickup region so as to respectively correspond to columns of the detection pixels and connected to cathodes of the diodes in the respectively corresponding columns,
   the drive method comprising:
   selecting one row selection line from the row selection lines;
   letting flow a first bias current through the diodes connected to the selected row selection line;
   reading out and retaining a first voltage generated on the corresponding signal line by the first bias current;
   letting flow a second bias current which is different from the first bias current through the diodes connected to the selected row selection line;
   reading out and retaining a second voltage generated on the corresponding signal line by the second bias current; and
   finding a difference between the first voltage and the second voltage.

* * * * *